United States Patent
Fujiseki et al.

(10) Patent No.: US 11,286,894 B2
(45) Date of Patent: Mar. 29, 2022

(54) FUEL PUMP MODULE

(71) Applicants: DENSO CORPORATION, Kariya (JP); TOYOTA JIDOSHA KABUSHIKI KAISHA, Toyota (JP)

(72) Inventors: Takemasa Fujiseki, Kariya (JP); Teppei Matsumoto, Kariya (JP); Tohru Sekido, Kariya (JP); Shinichi Morita, Toyota (JP); Shoma Fujita, Toyota (JP); Koji Maruyama, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/034,333

(22) Filed: Sep. 28, 2020

(65) Prior Publication Data

US 2021/0095625 A1 Apr. 1, 2021

(30) Foreign Application Priority Data

Sep. 30, 2019 (JP) .............................. JP2019-178267

(51) Int. Cl.
| | |
|---|---|
| *F02M 37/10* | (2006.01) |
| *F02M 37/50* | (2019.01) |
| *F02M 37/14* | (2006.01) |
| *F02M 37/20* | (2006.01) |
| *B60K 15/077* | (2006.01) |
| *F02M 37/44* | (2019.01) |
| *B60K 15/05* | (2006.01) |

(Continued)

(52) U.S. Cl.
CPC ............ *F02M 37/10* (2013.01); *F02M 37/14* (2013.01); *F02M 37/20* (2013.01); *F02M 37/50* (2019.01); *B60K 15/05* (2013.01); *B60K 2015/0772* (2013.01); *F02M 37/0029* (2013.01); *F02M 37/0082* (2013.01); *F02M 37/103* (2013.01); *F02M 37/106* (2013.01); *F02M 37/44* (2019.01); *F02M 37/46* (2019.01)

(58) Field of Classification Search
None
See application file for complete search history.

(56) References Cited

U.S. PATENT DOCUMENTS

| | | | | |
|---|---|---|---|---|
| 5,908,286 | A * | 6/1999 | Clemmons | .............. F04C 14/06 417/44.2 |
| 6,102,011 | A * | 8/2000 | Meyer | .................. F02M 37/103 123/509 |

(Continued)

*Primary Examiner* — Kevin R Steckbauer
(74) *Attorney, Agent, or Firm* — Nixon & Vanderhye P.C.

(57) ABSTRACT

A fuel pump module includes a fuel pump, a housing, a filter, a bracket, a lid, a fuel passage, and a pressure regulating valve. The fuel pump supplies a fuel in a fuel tank that defines an opening to an outside of the fuel tank. The housing has a cylindrical shape and supports the fuel pump. The bracket connects the filter to the housing. The lid covers the opening and defines a discharge port through which the fuel is supplied to the outside. The fuel passage connects the fuel pump to the discharge port. The pressure regulating valve has a gravity center inside a space defined by a first virtual cylindrical surface including the housing. A minimum circumscribed circle of both the housing and the filter is smaller than the opening.

11 Claims, 16 Drawing Sheets

(51) Int. Cl.
*F02M 37/46* (2019.01)
*F02M 37/00* (2006.01)

(56) References Cited

U.S. PATENT DOCUMENTS

| | | | | | |
|---|---|---|---|---|---|
| 6,877,373 | B2* | 4/2005 | Gilmour | ................ | B60K 15/00 73/290 R |
| 7,089,918 | B2* | 8/2006 | Gilmour | ................ | B60K 15/00 123/509 |
| 7,455,053 | B2* | 11/2008 | Nakagawa | ......... | B01D 35/0273 123/509 |
| 10,443,552 | B2* | 10/2019 | Fukuoka | ................ | B01D 29/11 |
| 10,544,762 | B2* | 1/2020 | Fukui | ................ | F02M 37/106 |
| 10,890,146 | B2* | 1/2021 | Suzuki | ................ | F02M 37/10 |
| 10,907,593 | B2* | 2/2021 | Higashi | ................ | F02M 37/103 |
| 2003/0102035 | A1* | 6/2003 | Dasilva | ................ | F02M 37/103 137/565.34 |
| 2004/0011129 | A1* | 1/2004 | Gilmour | ................ | B60K 15/00 73/313 |
| 2005/0115315 | A1* | 6/2005 | Gilmour | ................ | F02M 37/103 73/313 |
| 2005/0122693 | A1* | 6/2005 | Gilmour | ................ | B60K 15/00 361/728 |
| 2007/0199884 | A1* | 8/2007 | Nakagawa | ......... | B01D 35/0273 210/416.4 |
| 2017/0341510 | A1* | 11/2017 | Kono | ................ | F02M 37/0076 |
| 2018/0163679 | A1* | 6/2018 | Niwa | ................ | F02M 37/50 |
| 2018/0328323 | A1* | 11/2018 | Fukuoka | ................ | F02M 37/50 |
| 2019/0024617 | A1* | 1/2019 | Fukui | ................ | F02M 37/103 |
| 2019/0136810 | A1* | 5/2019 | Niwa | ................ | F02M 37/50 |
| 2019/0331073 | A1* | 10/2019 | Higashi | ................ | F02M 37/50 |
| 2020/0025164 | A1* | 1/2020 | Suzuki | ................ | F02M 37/0076 |
| 2021/0025359 | A1* | 1/2021 | Fisch | ................ | F02M 37/50 |
| 2021/0025360 | A1* | 1/2021 | Ito | ................ | F02M 37/0076 |
| 2021/0025361 | A1* | 1/2021 | Ito | ................ | B60K 15/03 |
| 2021/0025362 | A1* | 1/2021 | Takemura | ........... | F02M 37/106 |
| 2021/0033051 | A1* | 2/2021 | Ito | ................ | F16M 13/022 |
| 2021/0095624 | A1* | 4/2021 | Matsumoto | ........... | F02M 37/04 |
| 2021/0115885 | A1* | 4/2021 | Noguchi | ................ | F02M 37/103 |

* cited by examiner

FIRST EMBODIMENT

COMPARATIVE EXAMPLE

COMPARATIVE EXAMPLE

FUEL PUMP MODULE

CROSS REFERENCE TO RELATED APPLICATION

This application is based on Japanese Patent Application No. 2019-178267 filed on Sep. 30, 2019, the disclosure of which is incorporated herein by reference in its entirety.

TECHNICAL FIELD

The present disclosure relates to a fuel pump module.

BACKGROUND

A fuel supply device includes a pump supplying a fuel in a fuel tank to an outside of the fuel tank. The fuel tank includes an opening portion at a vertically upper part of the fuel tank and the fuel supply device is suspended vertically downward from the opening portion.

SUMMARY

A fuel pump module includes a fuel pump, a housing, a filter, a bracket, a lid, a fuel passage, and a pressure regulating valve. The fuel pump supplies a fuel in a fuel tank that defines an opening to an outside of the fuel tank. The filter is disposed in a suction side of the fuel pump. The bracket connects the filter to the housing. The lid is configured to cover the opening and defines a discharge port through which the fuel is supplied to the outside. The fuel passage fluidly connects the fuel pump to the discharge port. The pressure regulating valve is disposed in the fuel passage closer to the fuel pump than the discharge port. The pressure regulating valve has a gravity center that is positioned in a space defined by a virtual cylindrical surface including the housing. A minimum circumscribed circle of both the housing and the filter is smaller than the opening.

DETAILED DESCRIPTION

To begin with, examples of relevant techniques will be described.

A fuel supply device includes a pump supplying a fuel in a fuel tank to an outside of the fuel tank. The fuel tank includes an opening portion at a vertically upper part of the fuel tank and the fuel supply device is suspended vertically downward from the opening portion.

In hybrid vehicles including plug-in hybrid vehicles, there is an increasing demand for a smaller fuel tank to improve fuel consumption and install a device supplying energy such as a rechargeable battery. When the fuel tank is reduced in size, an opening portion of the fuel tank may be also reduced in size. Thus, there is a demand for a fuel pump module (i.e., fuel supply device) that can be inserted into the fuel tank even if the opening portion of the fuel tank is small.

A fuel pump module includes a fuel pump, a housing, a filter, a bracket, a lid, a fuel passage, and a pressure regulating valve. The fuel pump supplies a fuel in a fuel tank that defines an opening to an outside of the fuel tank. The filter is disposed in a suction side of the fuel pump. The bracket connects the filter to the housing. The lid is configured to cover the opening and defines a discharge port through which the fuel is supplied to the outside. The fuel passage fluidly connects the fuel pump to the discharge port. The pressure regulating valve is disposed in the fuel passage closer to the fuel pump than the discharge port. The pressure regulating valve has a gravity center that is positioned in a space defined by a virtual cylindrical surface including the housing. A minimum circumscribed circle of both the housing and the filter is smaller than the opening. Accordingly, the pump module can have a small diameter and all parts of the pump module other than the discharge port can be easily housed in the fuel tank.

First Embodiment

Figure 1A:
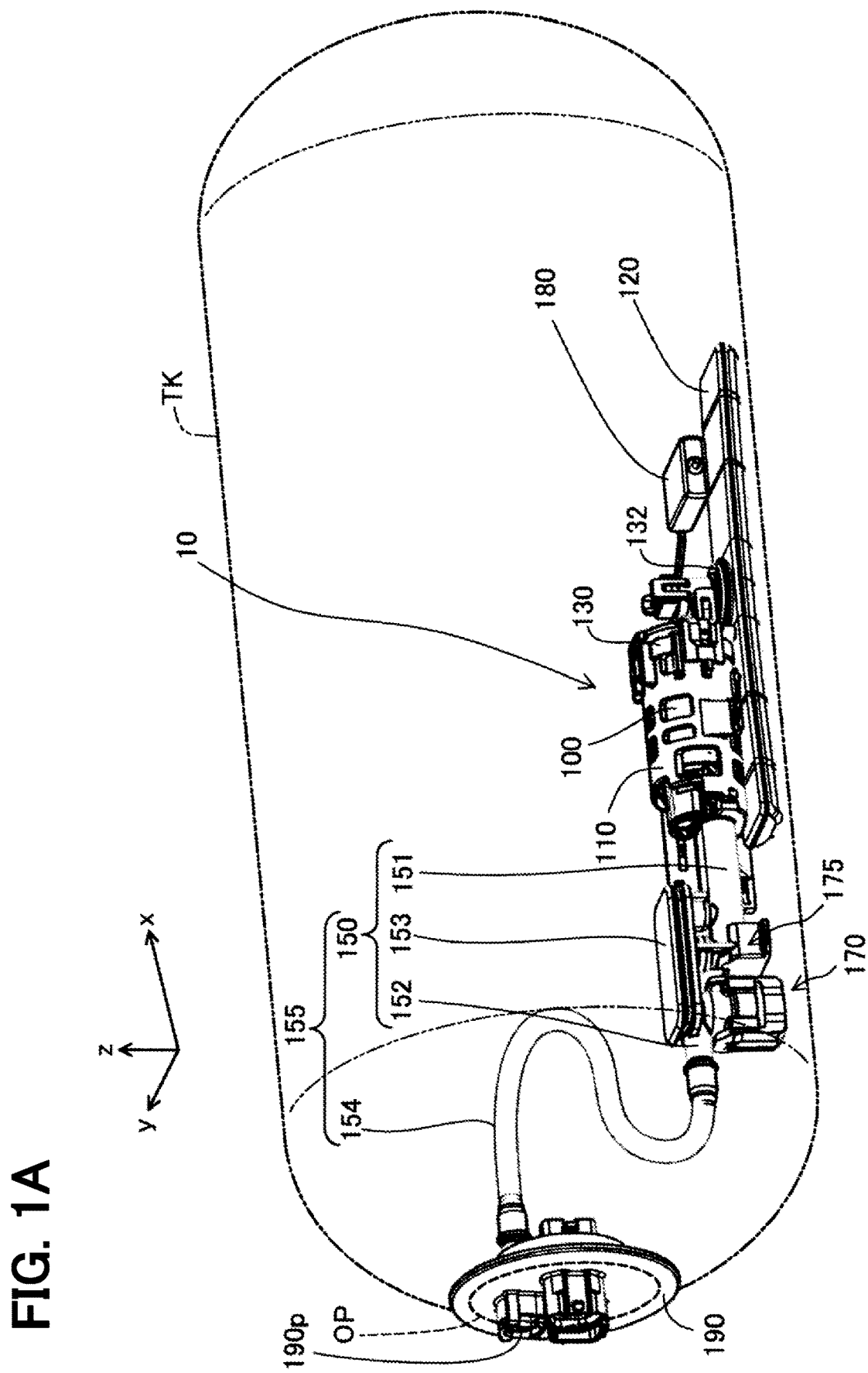
FIG. 1A is a schematic view of a fuel pump module attached to a fuel tank.

As shown in FIG. 1A, a fuel pump module 10 is attached to a fuel tank TK. A direction in which the fuel pump module 10 is inserted is defined as a x direction and a vertical direction is defined as a z direction. A direction perpendicular to both the x direction and the z direction is defined as a y direction. In this embodiment, a surface facing in the +x direction is defined as a front surface. The fuel pump module 10 includes a fuel pump 100, a housing 110, a filter 120, a bracket 130, a fuel passage 155, a pressure regulating valve 170, a float 180, and a lid 190. The fuel tank TK houses the fuel pump 100, the housing 110, the filter 120, the bracket 130, the fuel passage 155, the pressure regulating valve 170, and the float 180 of the fuel pump module 10 other than the lid 190. The lid 190 is attached to an opening OP of the fuel tank TK to cover the opening OP and defines a discharge port 190p to be in fluidly communication with the fuel passage 155.

The fuel pump 100 supplies a fuel in the fuel tank TK to an outside of the fuel tank TK such as an internal combustion engine. The housing 110 includes a housing passage 150 and a pump supporter 110p that has a cylindrical shape surrounding an outer circumference of the fuel pump 100. The bracket 130 is connected to a suction side of the fuel pump 100. A cap 132 is connected to the bracket 130. The cap 132 has an enlarged portion at a portion facing away from the bracket 130 and the enlarged portion is connected to the filter 120. The filter 120 removes impurities such as foreign substances from the fuel drawn into the fuel pump 100.

The fuel passage 155 fluidly connects the fuel pump 100 to the discharge port 190p and the fuel discharged out of the fuel pump 100 flows through the fuel passage 155 to the discharge port 190p. The fuel passage 155 includes a housing passage 150 and a flexible passage 154. The housing passage 150 is formed at the housing 110. The flexible passage 154 is a fuel tube fluidly connecting the housing passage 150 to the discharge port 190p and has a flexibility. The flexible passage 154 may be made of rubber. The float 180 is floating on the fuel in the fuel tank TK and connected to a sender configured to detect a residual amount of the fuel in the fuel tank TK.

Figure 1B:
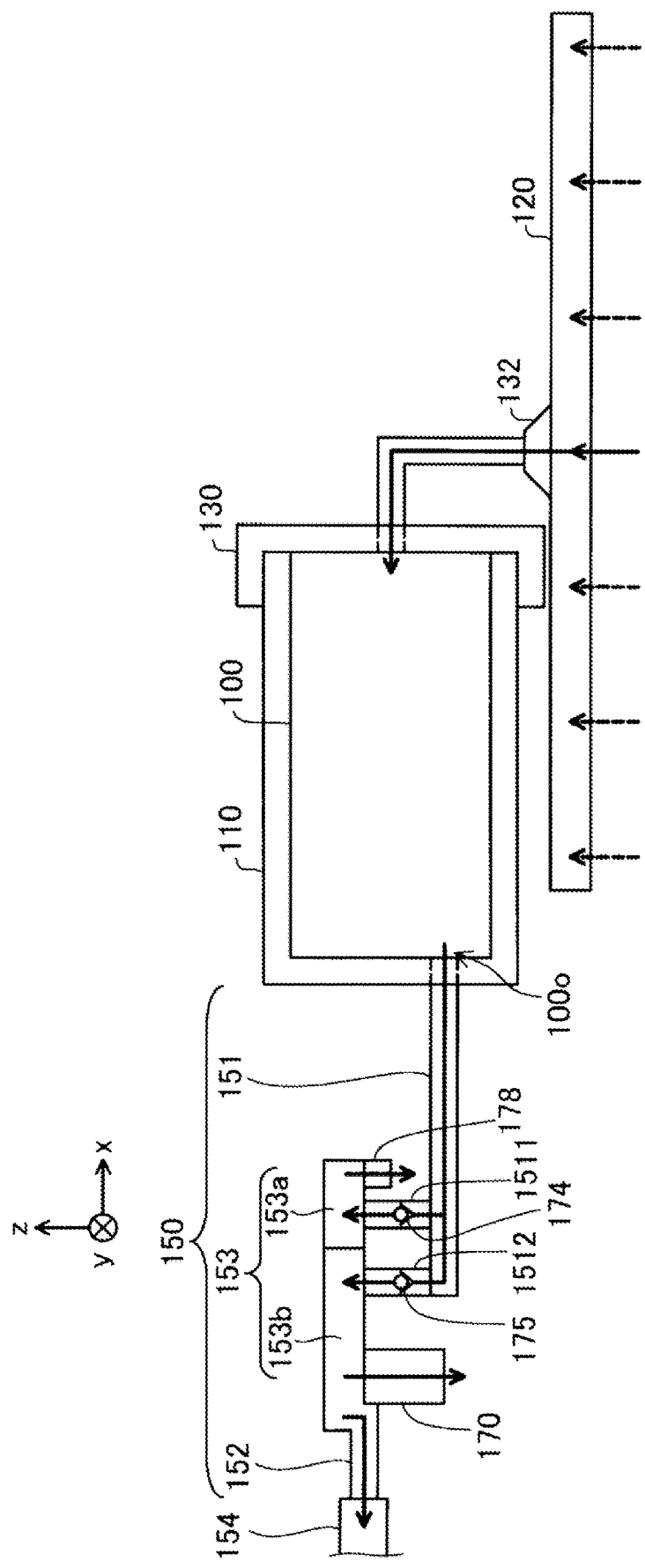
FIG. 1B is a diagram illustrating a schematic structure of the fuel pump module.

As shown in arrows in FIG. 1B, the fuel pump 100 of the fuel pump module 10 pumps the fuel through the filter 120, the cap 132, and the bracket 130. The fuel pumped by the fuel pump 100 flows to the flexible passage 154 through the housing passage 150.

Figure 2:
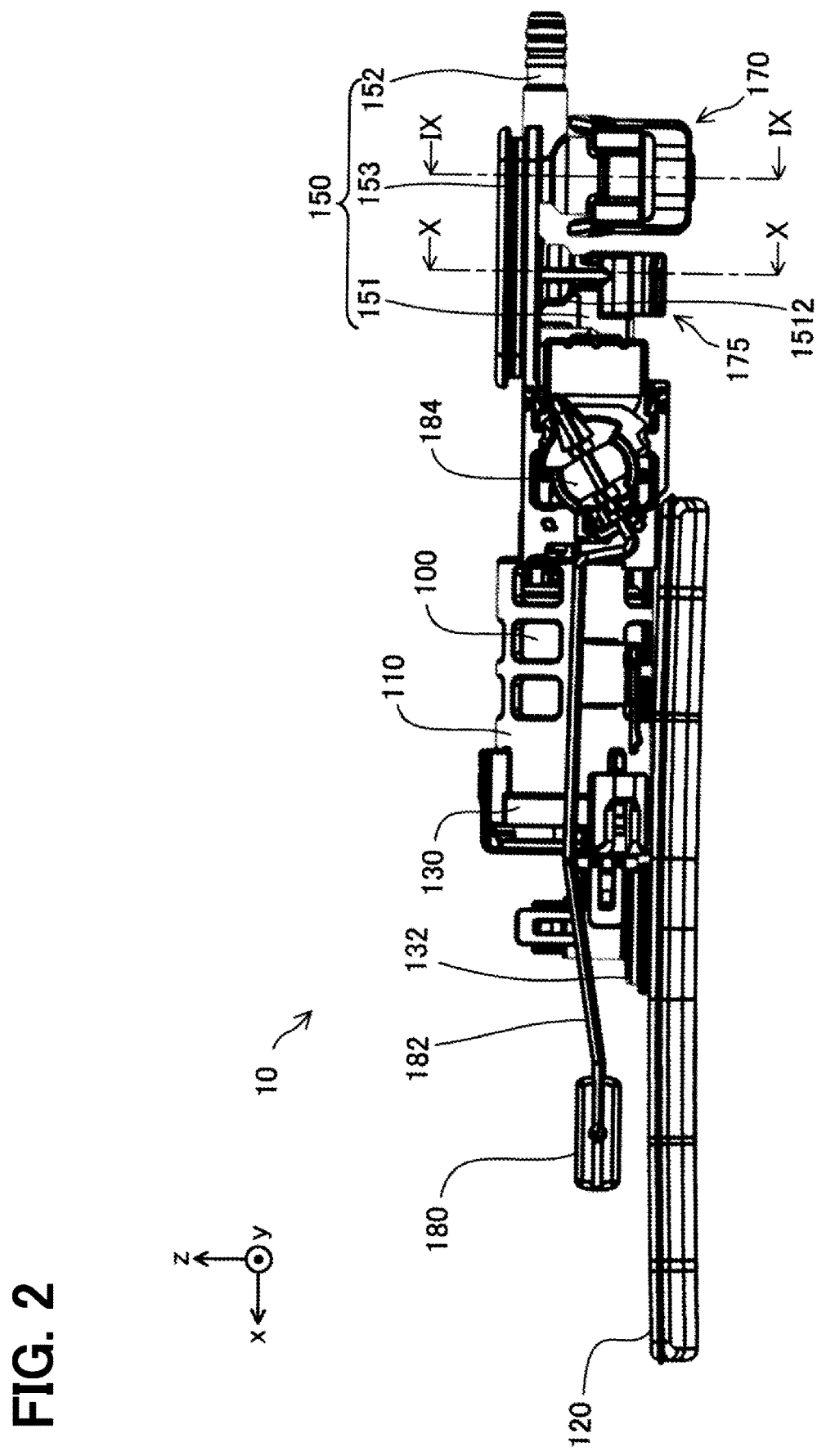
FIG. 2 is a right view of the fuel pump module.

The housing passage 150 is disposed in a back portion of the housing 110 (i.e., −x side of the housing 110) and includes a first passage 151, a second passage 152, a middle passage 153, and connecting passages 1511, 1512. The middle passage 153 includes a first middle passage 153a and a second middle passage 153b. The first passage 151 is connected to a discharge opening 100o of the fuel pump 100. The connecting passage 1511 fluidly connects the first passage 151 to the first middle passage 153a. The connecting passage 1512 fluidly connects the first passage 151 to the second middle passage 153b. A residual pressure retention valve 174 is disposed in the connecting passage 1511. The residual pressure retention valve 174 is a check valve to retain a pressure of the first middle passage 153a such that the pressure of the first middle passage 153a is restricted from decreasing when an operation of the fuel pump 100 is stopped. A residual pressure retention valve 175 is disposed in the connecting passage 1512. The residual pressure retention valve 175 is a check valve to retain a pressure of the second middle passage 153b such that the pressure of the second middle passage 153b is restricted from decreasing when the operation of the fuel pump 100 is stopped. Additionally, the first middle passage 153a defines a vapor removal hole 178. In FIG. 2, the vapor removal hole 178 is disposed in a front side (i.e., +x side) of the connecting passage 1511, but the vapor removal hole 178 may be disposed in +y side of the connecting passage 1511. The second passage 152 and the pressure regulating valve 170 are connected to the second middle passage 153b. The pressure regulating valve 170 is configured to regulate a pressure of the fuel fed from the second middle passage 153b to the flexible passage 154 through the second passage 152 to be a predetermined value.

The fuel in the housing passage 150 flows as follows. The fuel is supplied to the first passage 151 through the discharge opening 100o of the fuel pump 100 and fed to both the first middle passage 153a and the second middle passage 153b through the two connecting passages 1511 and 1512. The vapor removal hole 178 is a hole through which a constant amount of the fuel flows out of the first middle passage 153a and returns to the fuel tank TK. The vapor removal hole 178 mainly has a function to remove a vapor of the fuel. The fuel fed to the second middle passage 153b flows to the flexible passage 154 through the second passage 152. When the fuel is supplied into the second middle passage 153b, the residual pressure retention valve 175 restricts the fuel from flowing back to the first passage 151 and retains the pressure of the second middle passage 153b. That is, the residual pressure retention valve 175 retains the pressure of the second middle passage 153b. The pressure regulating valve 170 discharges the fuel from the second middle passage 153b to the second passage 152 with a pressure more than a predetermined value to regulate the pressure of the fuel supplied to the second passage 152.

Figure 5:
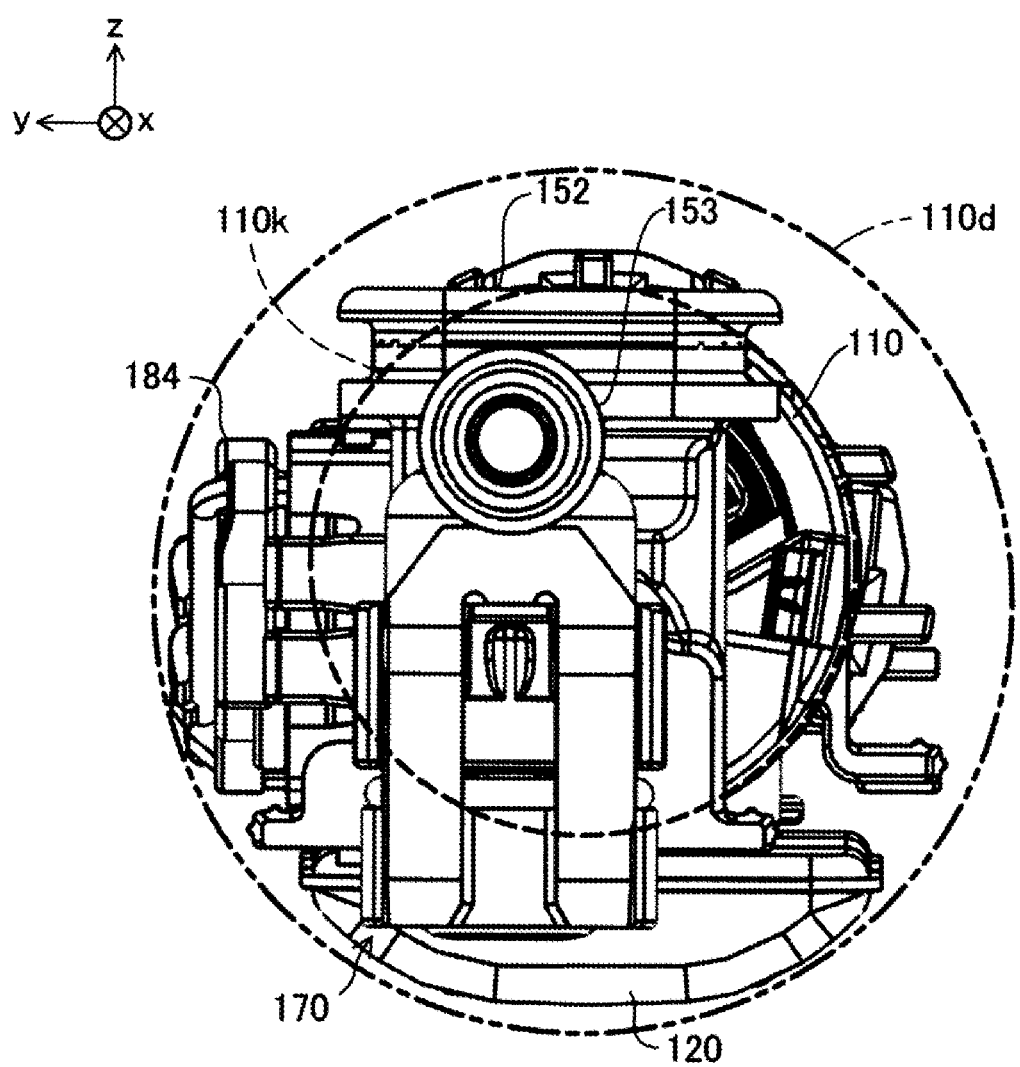
FIG. 5 is a back view of the fuel pump module.
Figure 6:
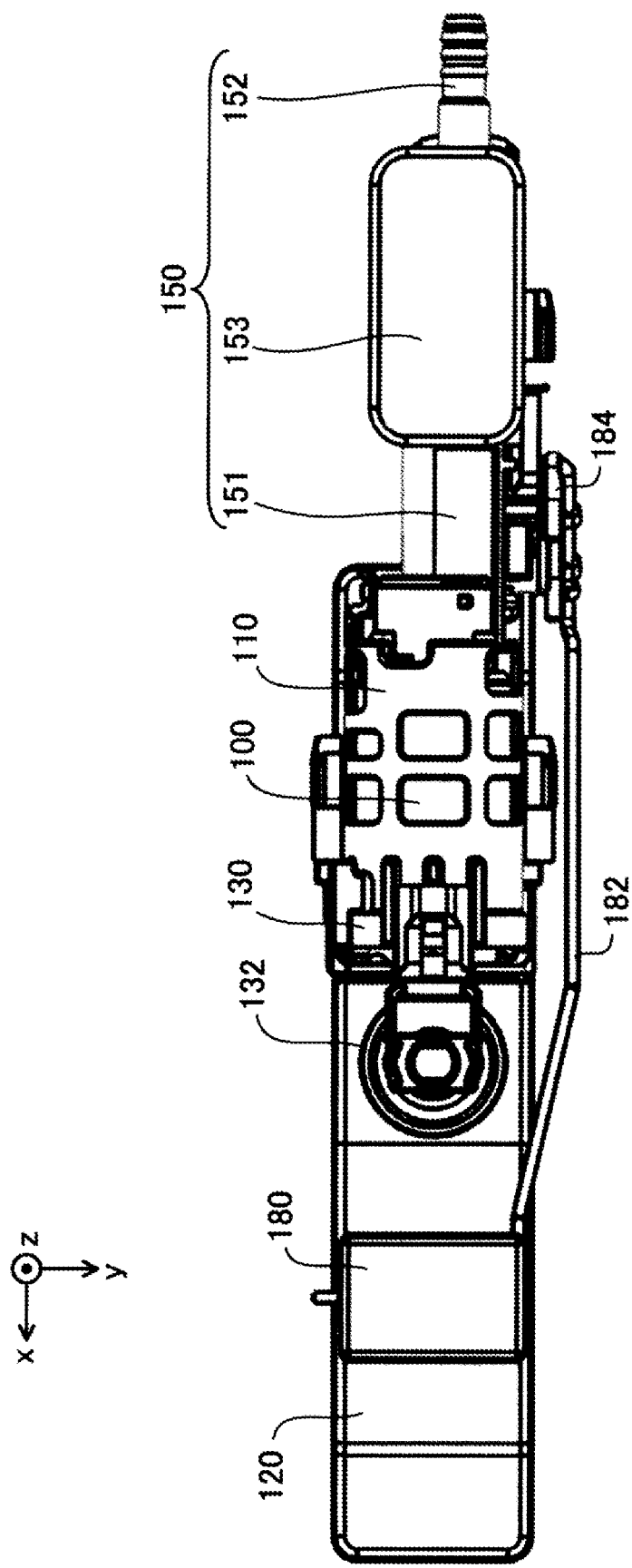
FIG. 6 is a plane view of the fuel pump module.
Figure 7:
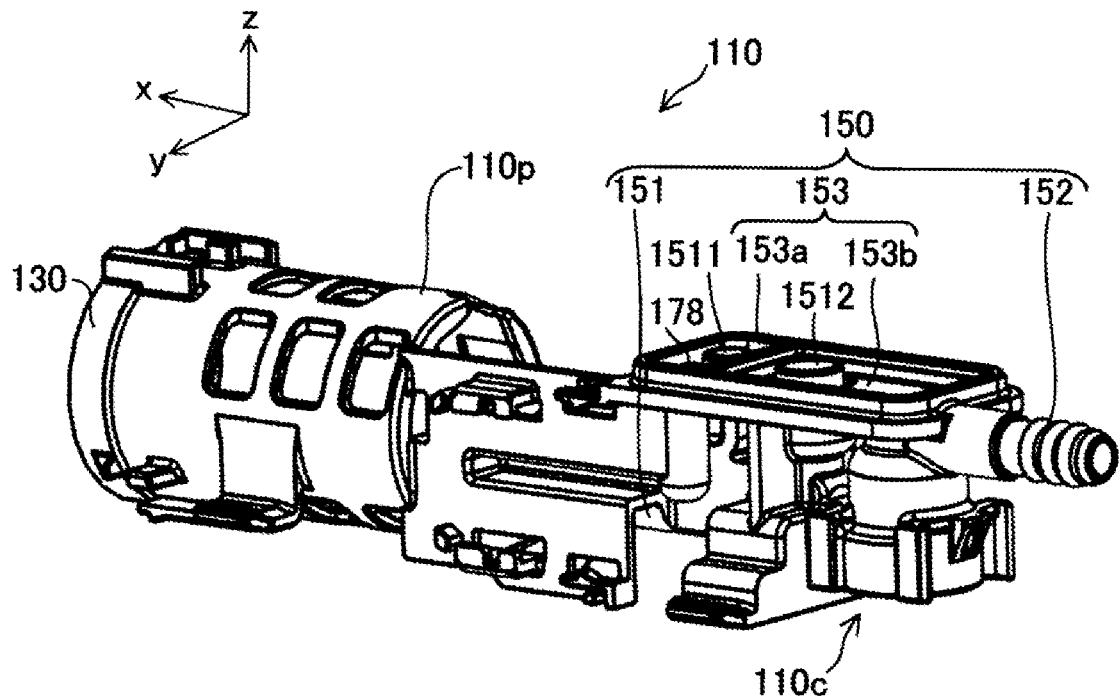
FIG. 7 is a perspective view of a housing and a bracket.
Figure 8:
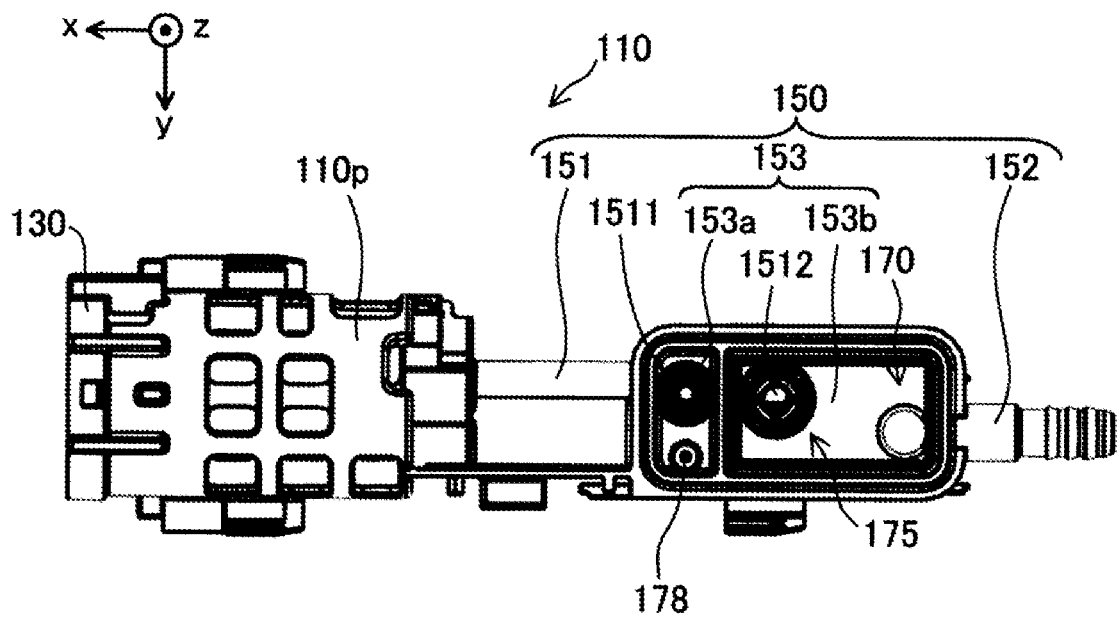
FIG. 8 is a plane view of the housing and the bracket.

In FIGS. 2 to 6, five sided views of the fuel pump module 10 other than the lid 190 and the flexible passage 154 are illustrated. FIG. 7 is a perspective view of the housing 110 and FIG. 8 is a plane view of the housing 110.

Figure 3:
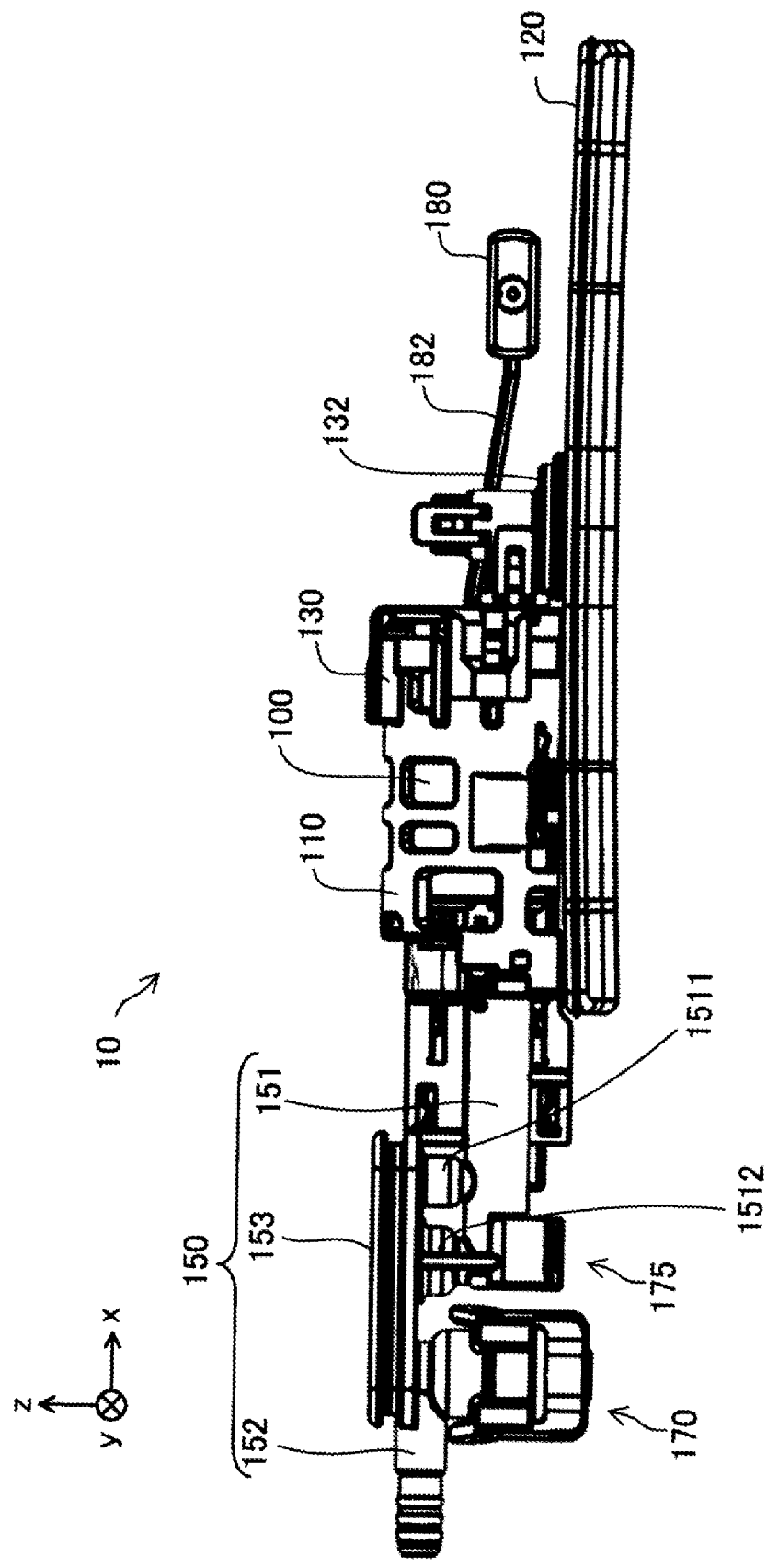
FIG. 3 is a left view of the fuel pump module.

The housing passage 150 is formed in a back portion of the housing 110. The sender 184 is disposed in a right side of the first passage 151. The float 180 is disposed in a front side of the bracket 130 and a vertically upper side of the filter 120. The float 180 and the sender 184 are connected with each other with a connecting rod 182 and constitutes a fuel amount meter. The connecting rod 182 is located along a right surface of the housing 110. The sender 184 and the connecting rod 182 may be located along a left surface of the first passage 151. As shown in FIGS. 2, 3, and 6, the float 180 is located in the vertically upper side of the filter 120 and is not displaced from the filter 120 in the y direction. In other words, the float does not protrude from the filter 120 in the y direction. The float 180 has a specific gravity less than the fuel, and thus floats on the fuel. When the fuel is supplied into the fuel tank TK and the amount of the fuel in the fuel tank TK is increased, the float 180 moves upward and rotates the sender 184 through the connecting rod 182. In FIG. 2, the sender 184 rotates clockwise. The amount of the fuel in the fuel tank TK can be measured from a rotational position of the sender 184.

Figure 4:
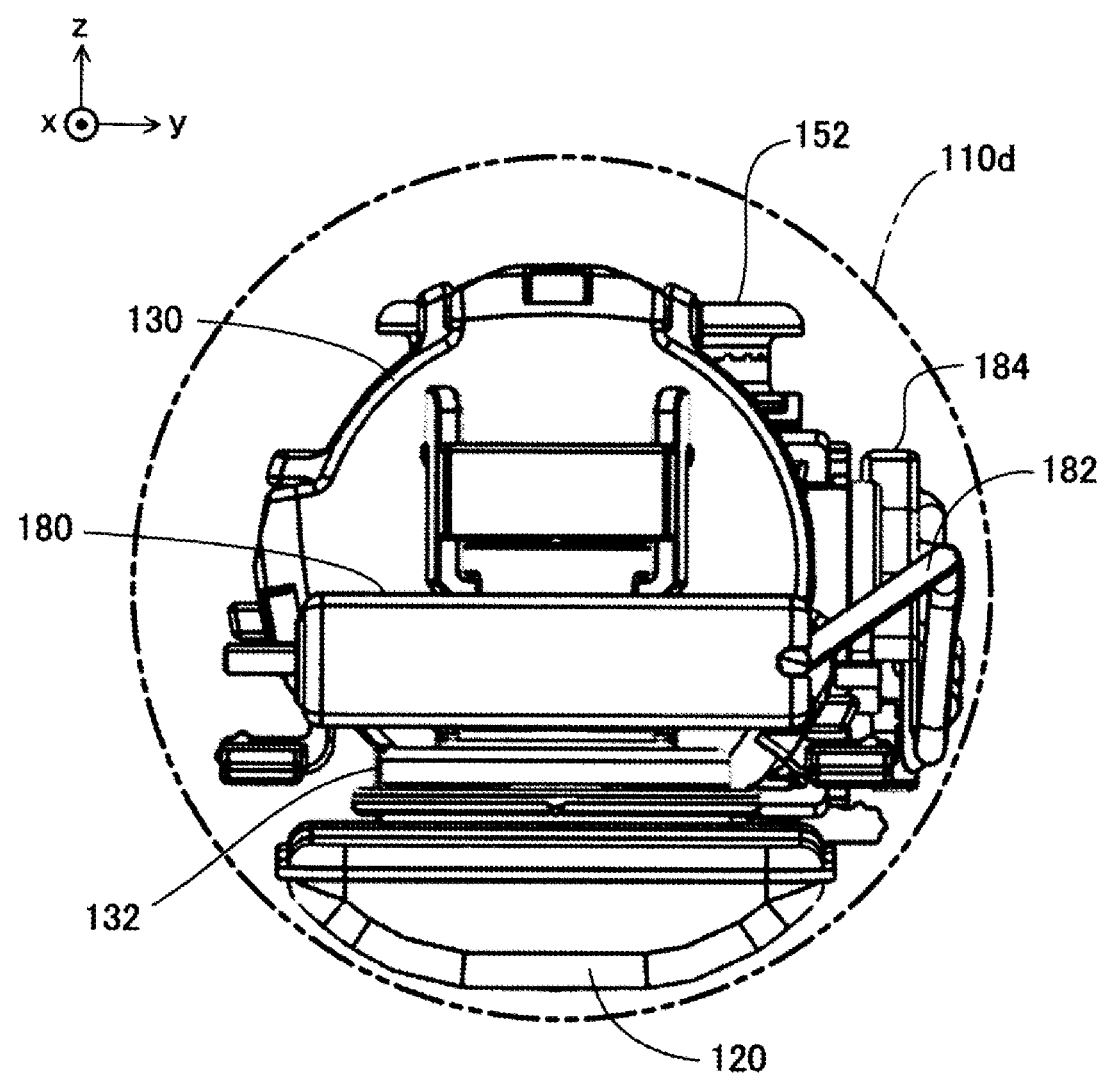
FIG. 4 is a front view of the fuel pump module.

An outer diameter D of the housing 110 defines a first virtual cylindrical surface 110k. A virtual cylindrical surface having an outer diameter of 2D that is twice as large as the outer diameter of the housing 110 is defined as a second virtual cylindrical surface 110d. The second virtual cylindrical surface 110d has a diameter and an area that are smaller than those of the opening OP of the fuel tank TK. As shown in FIGS. 4 and 5, the fuel pump 100, the housing 110, the filter 120, the bracket 130, the cap 132, the first passage 151, the middle passage 153, the second passage 152, the float 180, and the sender 184 are all housed in a space defined by the second virtual cylindrical surface 110d having the diameter of 2D and a center as a center axis of the fuel pump 100. The housing passage 150 is housed in a space defined by the first virtual cylindrical surface 110k. The center of the second virtual cylindrical surface 110d does not necessarily coincide with the center axis of the fuel pump 100.

Figure 9:
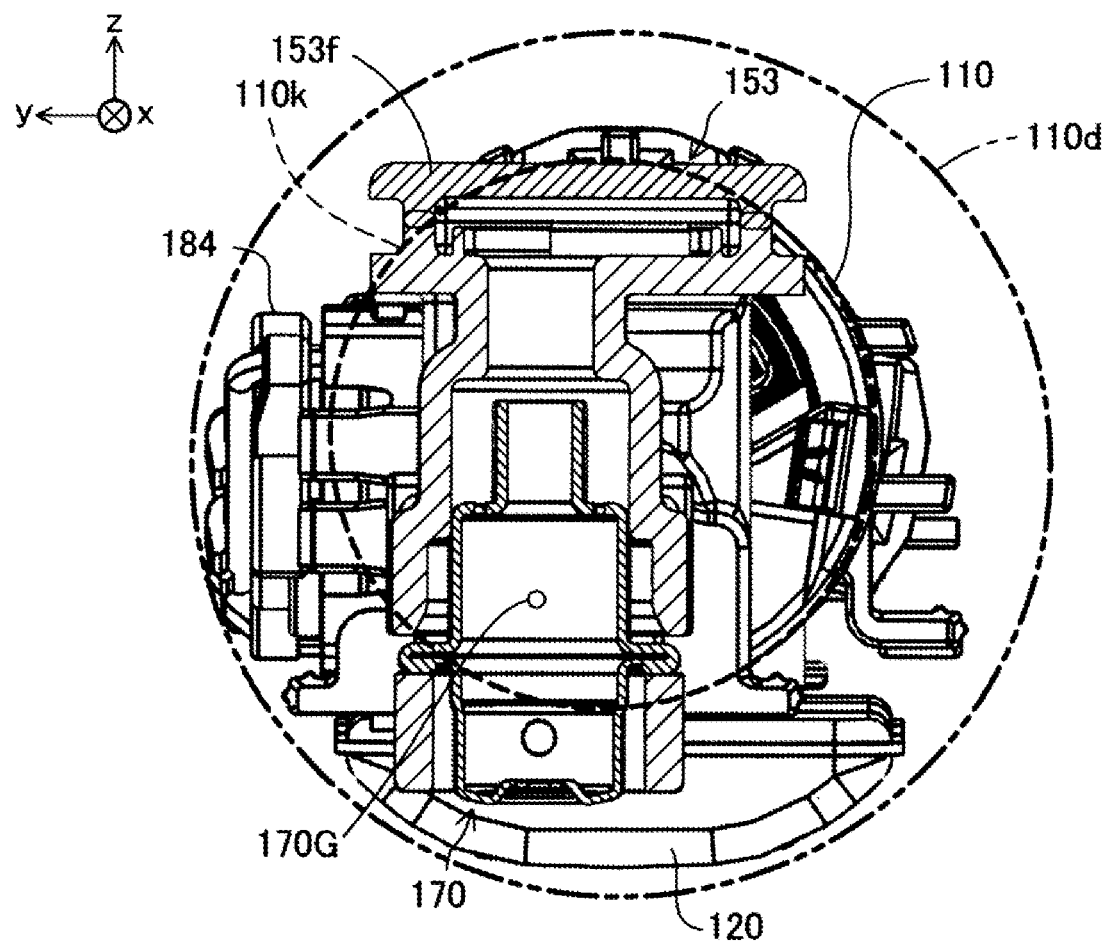
FIG. 9 is a cross-sectional view taken along a line IX-IX in FIG. 2 and passing through a pressure regulating valve of the fuel pump module.

FIG. 9 is a cross sectional view taken along a line IX-IX in FIG. 2, passing through the pressure regulating valve 170, and viewed in an arrow direction in FIG. 2. As shown in FIG. 9, the pressure regulating valve 170 has a gravity center 170G positioned in the space defined by the first virtual cylindrical surface 110k.

Figure 10:
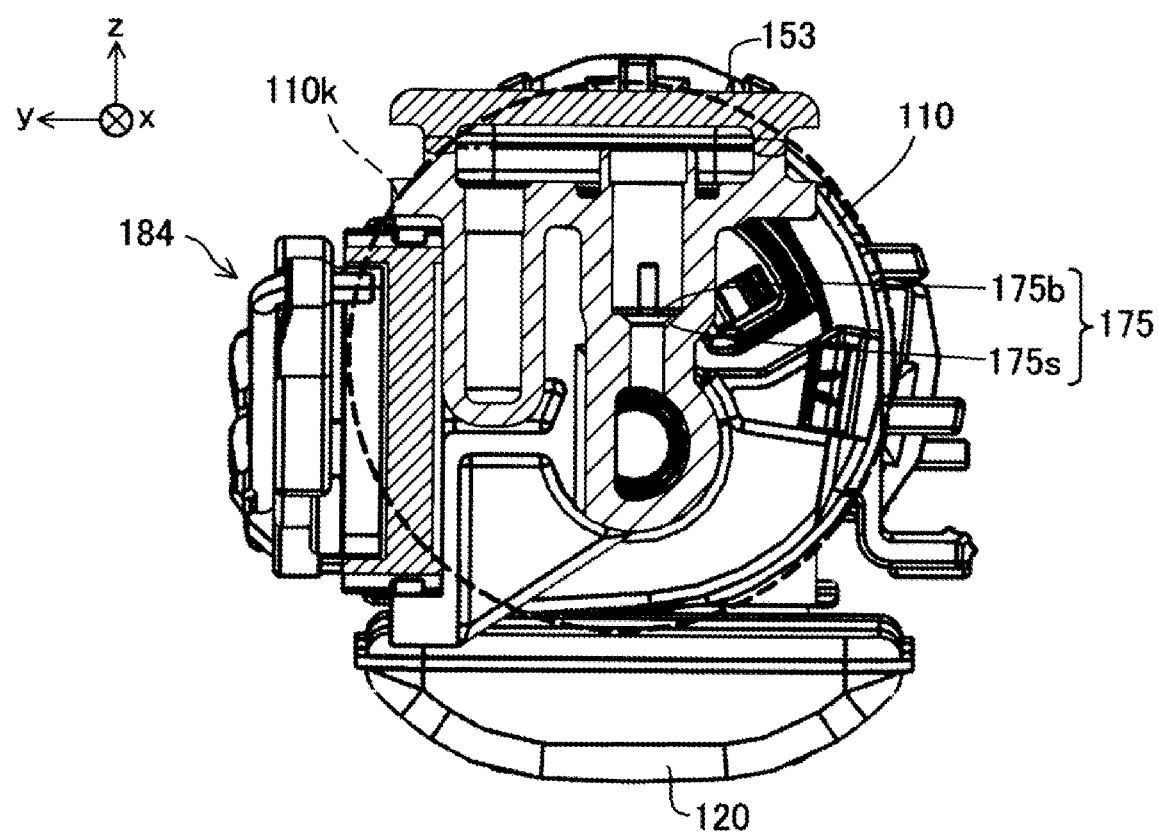
FIG. 10 is a cross-sectional view taken along a line X-X in FIG. 2 and passing through a residual pressure retention valve of the fuel pump module.

FIG. 10 is a cross sectional view taken along a line X-X in FIG. 2, passing through the residual pressure retention valve 175, and viewed in the arrow direction in FIG. 2. As shown in FIG. 10, the valve body 175b and the valve seat 175*s* of the residual pressure retention valve 175 are positioned in the space defined by the first virtual cylindrical surface 110*k*.

Figure 11:
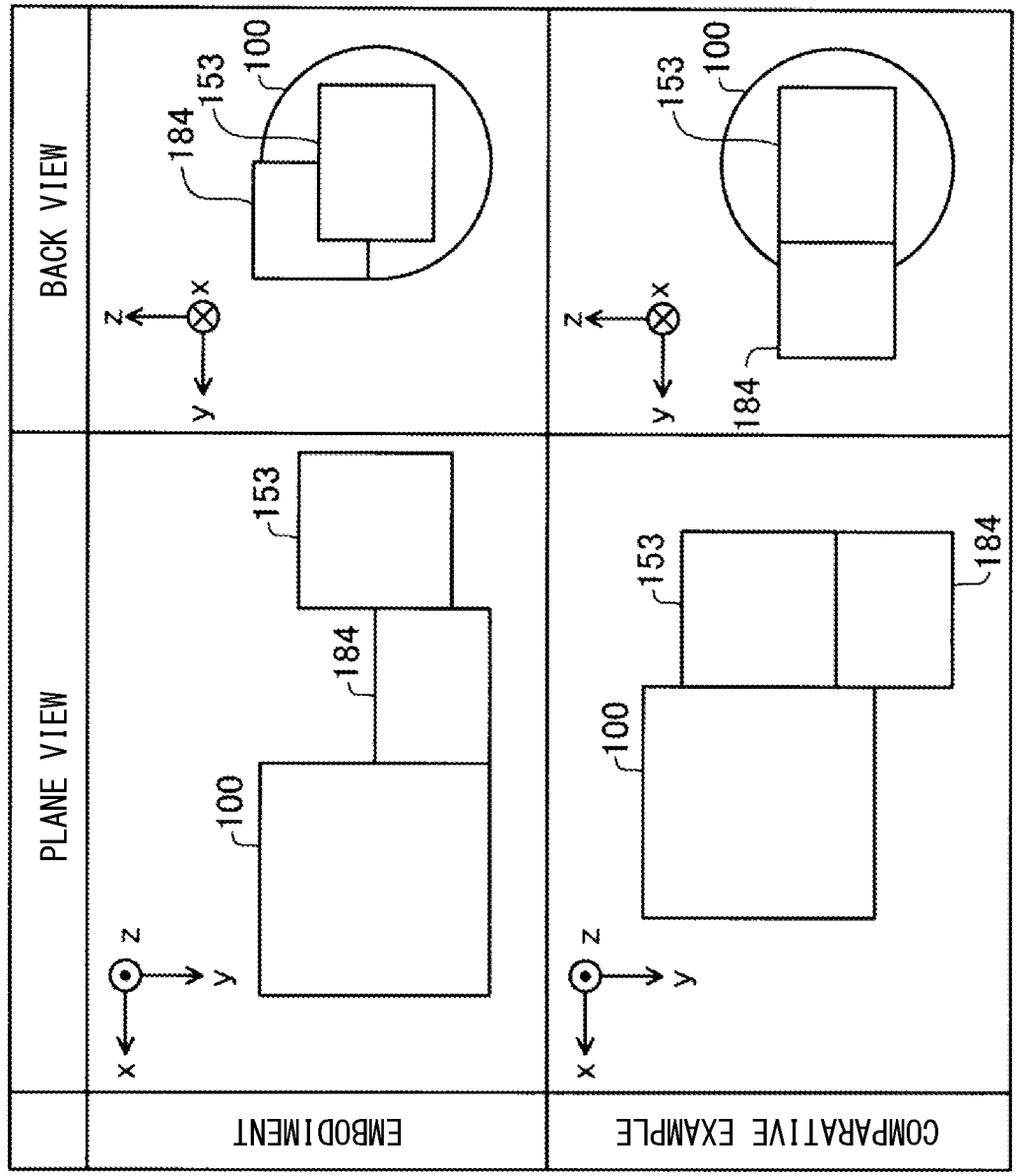
FIG. 11 is a diagram illustrating a plane layout and a back layout of the fuel pump module.

A layout of the fuel pump module 10 in this embodiment and a layout of a pump module in a comparison example will be compared with reference to FIG. 11. In this embodiment, the fuel pump 100, the sender 184, and the middle passage 153 are arranged in this order from the front side to the back side of the fuel pump module 10 in the x direction. In the comparison example, the sender 184 is positioned in a +y side of the middle passage 153. Thus, the fuel pump module 10 in this embodiment has a size in the y direction smaller than the fuel pump in the comparison example. As a result, even when the opening OP of the fuel tank TK is small, the fuel pump module 10 can be inserted into the fuel tank TK.

Figure 12:
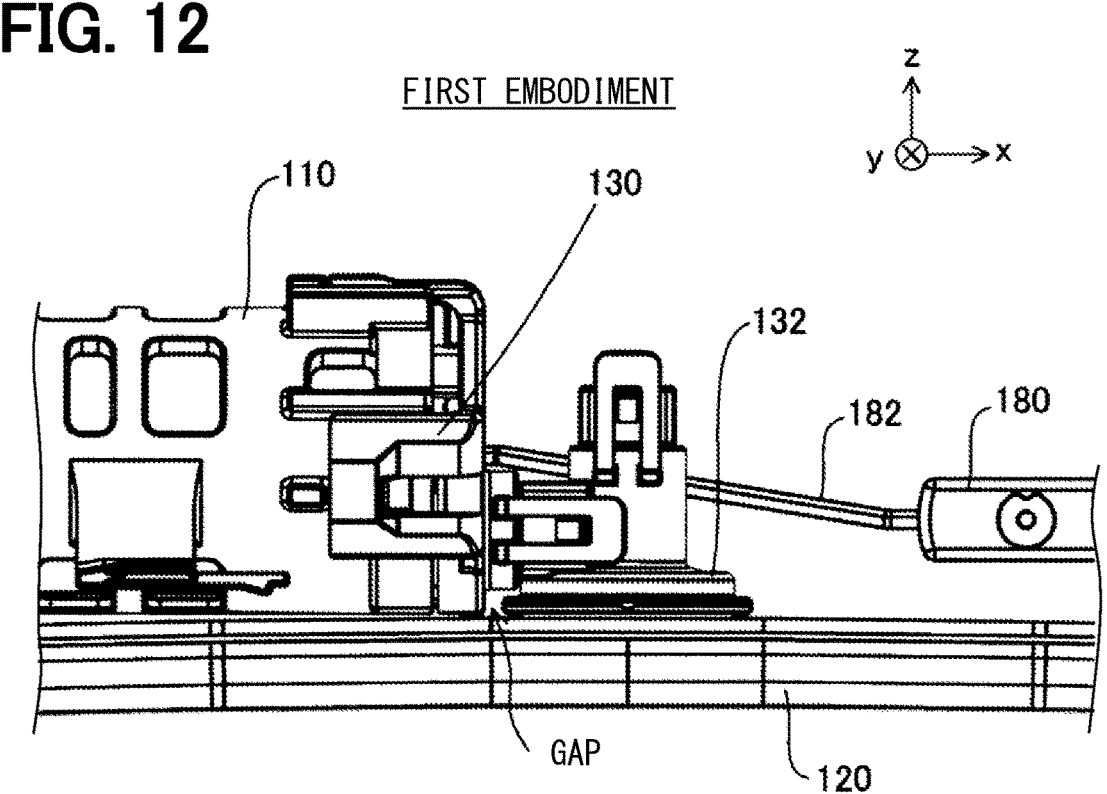
FIG. 12 is an enlarged view of a vicinity of the bracket in a first embodiment.
Figure 13:
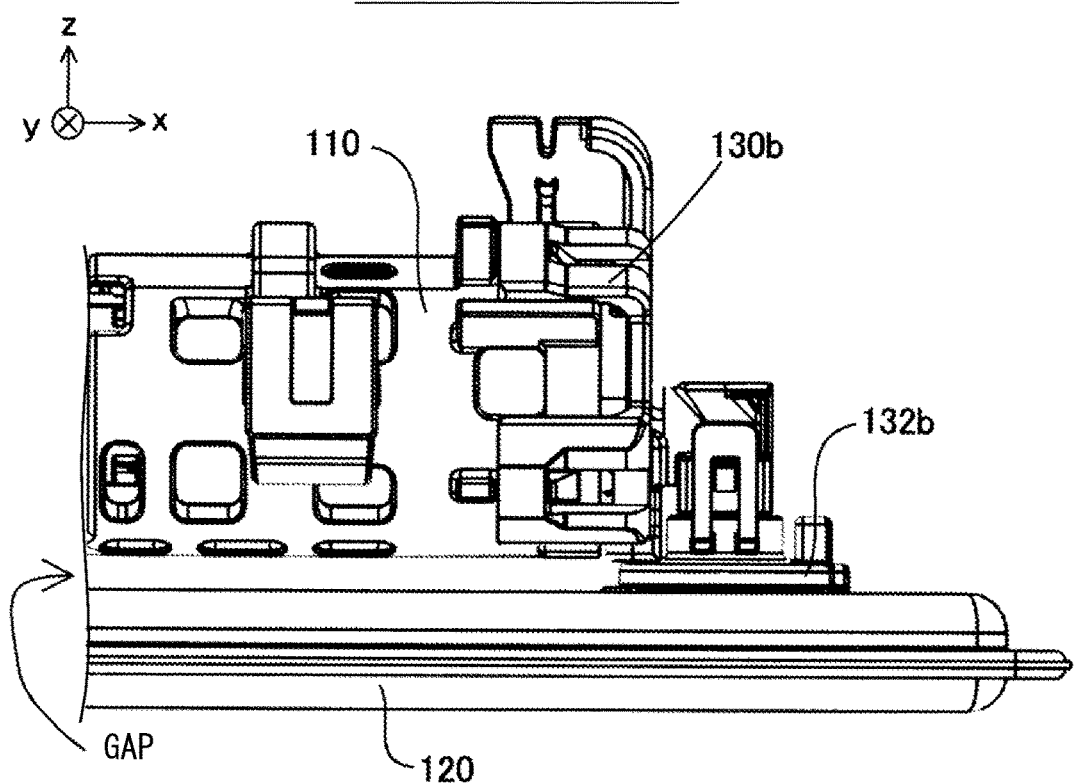
FIG. 13 is an enlarged view of a vicinity of a bracket in a comparison example.

FIG. 12 is an enlarged view of a vicinity of the bracket 130 in the first embodiment. In the first embodiment, there is a gap between the bracket 130 and the cap 132 in the x direction. As a result, a gap between the fuel pump 100 and the housing 110 in the z direction is unnecessary. FIG. 13 is an enlarged view of a bracket 130*b* in a comparison example. In the comparison example, a part of a cap 132*b* overlaps with the bracket 130*b* in the z direction. Thus, there is a gap between the fuel pump 100 and the housing 110 in the z direction. Because the gap is defined between the bracket 130 and the cap 132 in the x direction, the fuel pump module 10 can reduce gaps in the z direction and a size in the z direction. Thus, even when the opening OP of the fuel tank TK is small, the fuel pump module 10 can be inserted into the fuel tank TK.

Figure 14:
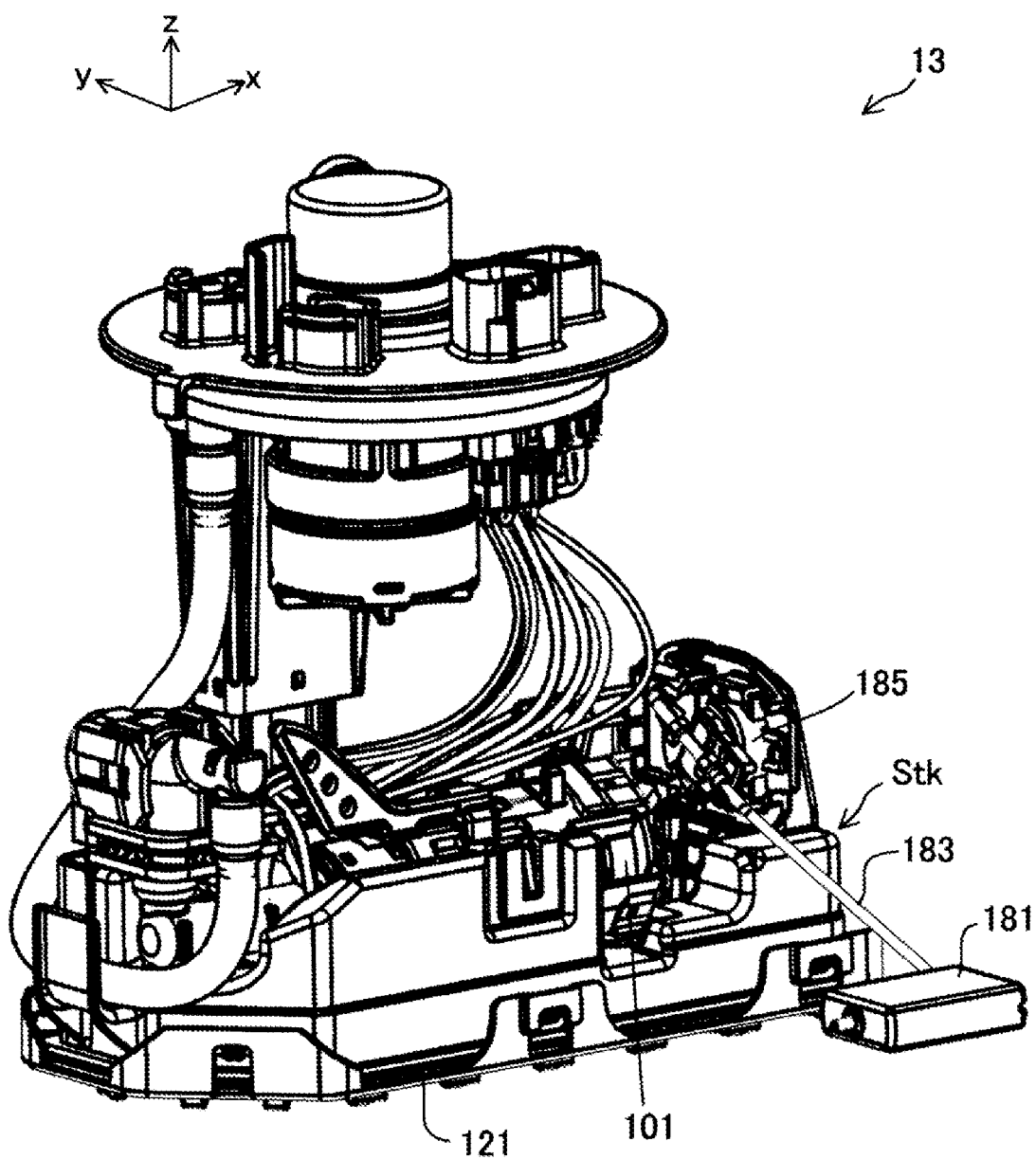
FIG. 14 is a perspective view of a fuel pump module in a comparison example.

FIG. 14 is a perspective view of a fuel pump module 13 in a comparison example that is used for a fuel tank defining an opening at a vertically upper portion of the fuel tank. In the comparison example, a fuel pump 101 is disposed in a sub tank Stk and a filter 121 is disposed in a vertically lower side of the sub tank Stk. Thus, it is difficult to reduce a size of the fuel pump module 13 in the x direction and the y direction to be a size less than the opening of the fuel tank. In the present disclosure, a size of the fuel pump module 10 in both the y direction and the z direction can be less than that of the opening OP of the fuel tank TK. The fuel pump module 13 in the comparison example has the sab tank Stk, but the fuel pump module 10 in the first embodiment has the filter 120 in contact with a bottom of the fuel tank TK. The filter 120 extends in a longitudinal direction of the fuel tank TK. As a result, the fuel pump module 10 does not necessarily have the sab tank Stk, thus a sub-tank less structure can be achieved with the fuel pump module 10. However, the sab-tank Stk may be disposed also in the first embodiment.

According to the first embodiment, as shown in FIG. 9 illustrating the cross section passing through the pressure regulating valve 170, the pressure regulating valve 170 has a gravity center 170G inside the space defined by the first virtual cylindrical surface 110*k*. That is, the gravity center 170G is located in the space defined by the first virtual cylindrical surface 110*k* that extends from an outer diameter surface of the housing 110 along an axis of the housing 110. A cross section of the fuel pump module 10 that is perpendicular to an axis of the first virtual cylindrical surface 110*k* including the housing 110 and the filter 120 has an area smaller than an area of the opening OP, regardless of a position of the cross section in the axial direction. As a result, the fuel pump module 10 can be inserted into the fuel tank TK.

According to the first embodiment, the valve body 175*b* and the valve seat 175*s* of the residual pressure retention valve 175 are disposed inside the space defined by the first virtual cylindrical surface 110*k*. Thus, even when the opening OP of the fuel tank TK is small, a body portion of the fuel pump module 10 other than the lid 190 can be inserted into the fuel tank TK. The valve body 175*b* and the valve seat 175*s* are not necessarily disposed inside the space defined by the first virtual cylindrical surface 110*k*.

According to the first embodiment, the hosing passage 150 is formed at the housing 110 and a part of the housing passage 150 to an upstream side of the pressure adjusting valve is disposed inside the space defined by the first virtual cylindrical surface 110*k*. As shown in FIG. 9, the middle passage 153 of the housing passage 150 has a lid 153*f* and the lid 153*f* does not protrude from the second virtual cylindrical surface 110*d*. Thus, the fuel pump module 10 can easily pass through the opening OP of the fuel tank TK and be inserted into the fuel tank TK.

According to the first embodiment, the fuel pump 100, the housing 110, the filter 120, the bracket 130, and the pressure regulating valve 170 are housed inside the space defined by the second virtual cylindrical surface 110*d*. Thus, the fuel pump module 10 can be inserted into the fuel tank TK. The fuel pump 100, the housing 110, the filter 120, the bracket 130, and the pressure regulating valve 170 are not necessarily disposed inside the space defined by the second virtual cylindrical surface 110*d*.

According to the first embodiment, the fuel pump module 10 includes the float 180, the connecting rod 182, and the sender 184 that constitute the fuel amount meter and are located inside the space defined by the second virtual cylindrical surface 110*d*. Thus, the fuel pump module 10 can be inserted into the fuel tank TK.

According to the first embodiment, the float 180 is positioned at a vertically upper side of the filter 120. Thus, even if the opening OP of the fuel tank TK is small, the fuel pump module 10 can be inserted into the fuel tank TK. The float 180 is not necessarily positioned in the vertically upper side of the filter 120 while the float 180 is located inside the space defined by the second virtual cylindrical surface 110*d* when the fuel pump module 10 is inserted into the fuel tank TK.

Second Embodiment

Figure 15:
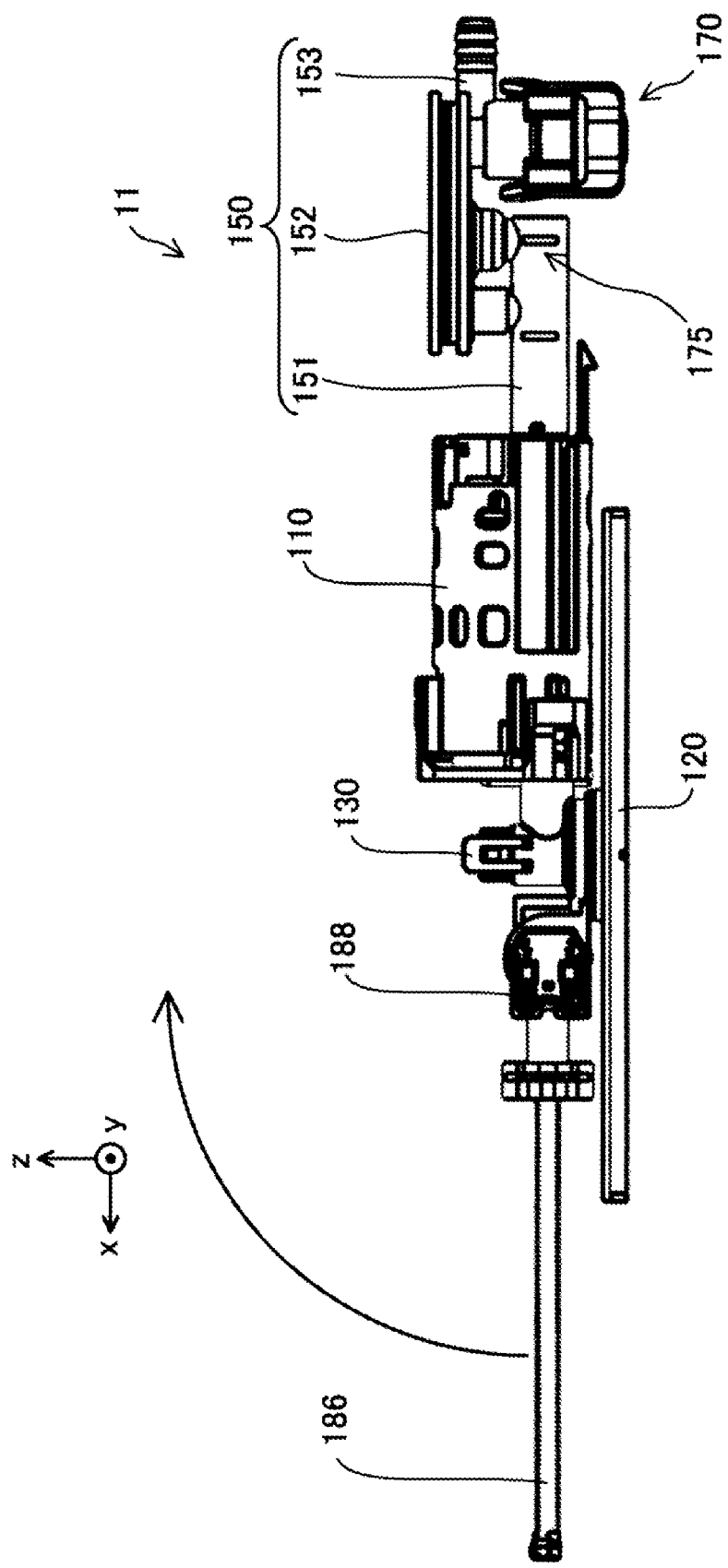
FIG. 15 is a right view of a fuel pump module in a second embodiment.
Figure 16:
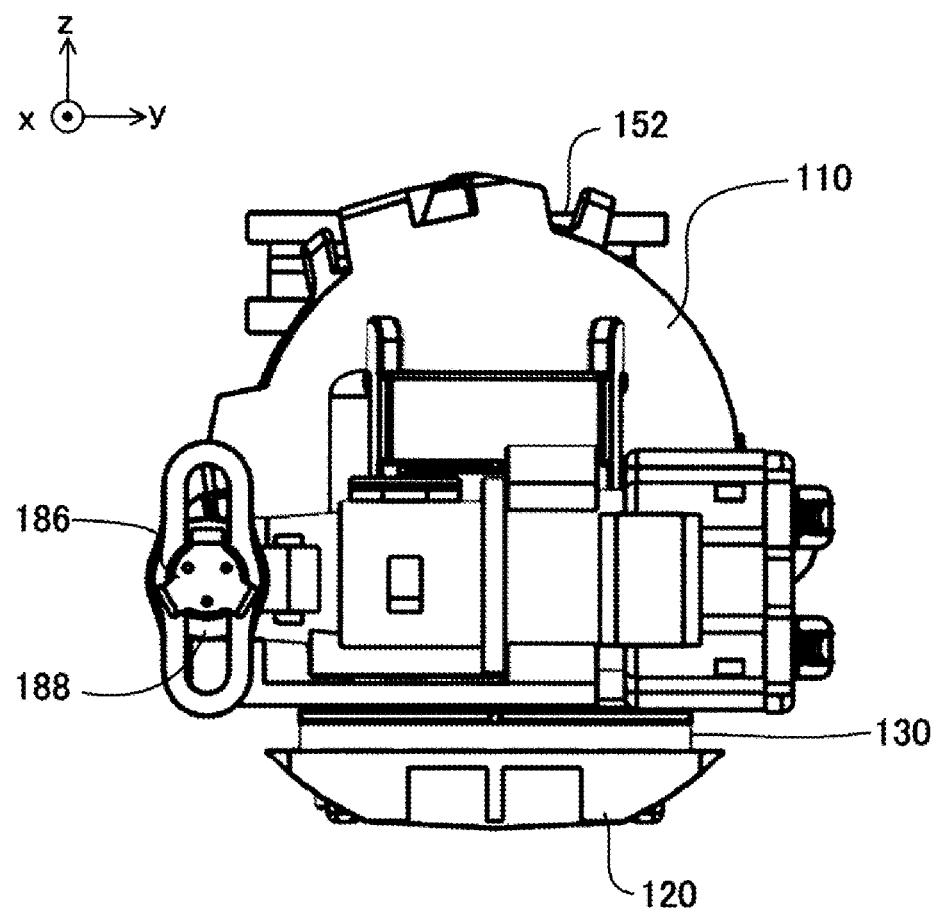
FIG. 16 is a front view of a fuel pump module in the second embodiment.

As shown in FIGS. 15 and 16, a fuel pump module 11 in a second embodiment includes, as a fuel amount meter, a hollow pipe 186 and an ultrasonic wave transmitting receiving unit 188 instead of including the float 180 and the sender 184. Other structures are similar to the first embodiment. When the fuel pump module 11 is inserted into the fuel tank TK, the hollow pipe 186 extends in the x direction as described in FIG. 15. Because the hollow pipe 186 and the ultrasonic wave transmitting receiving unit 188 can be located inside the space defined by the second virtual cylindrical surface 110*d*, the fuel pump module 11 can be easily inserted into the fuel tank TK. After the fuel pump module 11 is inserted into the fuel tank TK, the hollow pipe 186 rotates clockwise in FIG. 15 together with the ultrasonic wave transmitting receiving unit 188 and extends in the z direction. With extending in the z direction, the ultrasonic wave transmitting receiving unit 188 measures the amount of fuel in the fuel tank TK.

Figure 17:
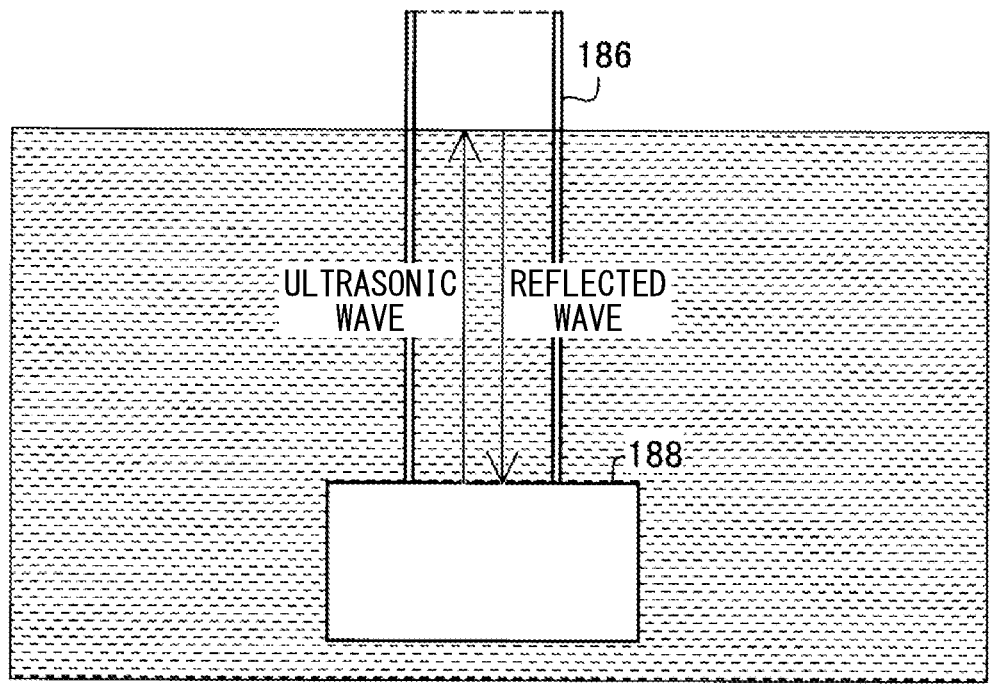
FIG. 17 is a diagram illustrating a principle of measuring a residual amount of a fuel in the second embodiment.

FIG. 17 is a schematic view illustrating a principle of measuring the amount of fuel. The fuel in the fuel tank TK flows into the hollow pipe 186 and a liquid level in the hollow pipe 186 is the same as a liquid level of the fuel tank TK outside of the hollow pipe 186. When the ultrasonic wave transmitting receiving unit 188 transmits ultrasonic wave in the z direction in the hollow pipe 186, the ultrasonic wave is reflected at an interface between the fuel and an air and the ultrasonic wave transmitting receiving unit 188 receives the reflected ultrasonic wave. The ultrasonic wave transmitting receiving unit calculates the amount of fuel by calculating a height of the fuel filled in the hollow pipe 186 with the time from transmitting the ultrasonic wave to receiving the reflected ultrasonic wave.

In the second embodiment, the hollow pipe 186 and the ultrasonic wave transmitting receiving unit 188 are located inside the space defined by the second virtual cylindrical surface 110d. As a result, even if the opening OP of the fuel tank TK is small, the fuel pump module 10 can be inserted into the fuel tank TK.

Figure 18:
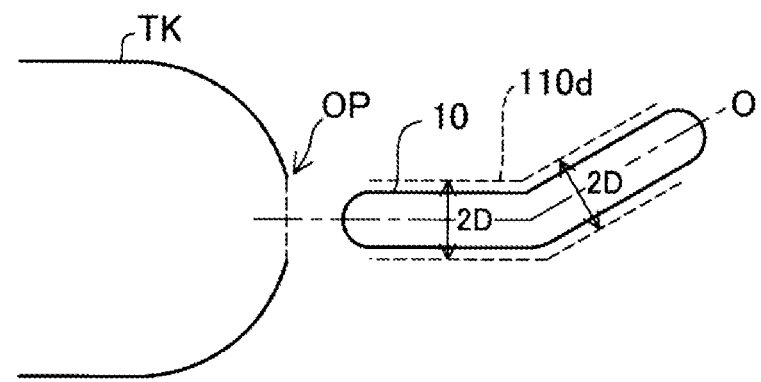
FIG. 18 is a diagram illustrating a fuel pump having a curved shape.

As shown in FIG. 18, even if the fuel pump module 10 is curved, a cross section of the fuel pump module 10 perpendicular to an axis O of the second virtual cylindrical surface 110d has an area less than an area of the opening OP of the fuel tank TK, regardless of where the cross section is cut perpendicular to the axis O. That is, a size of a minimum circumscribed circle of both the housing 110 and the filter 120 is less than a size of the opening OP. Thus, the fuel pump module 10 can be inserted into the fuel tank TK.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A fuel pump module comprising:
a fuel pump;
a housing having a cylindrical shape and supporting the fuel pump;
a filter disposed in a suction side of the fuel pump;
a bracket connecting the filter to the housing;
a lid defining a discharge port through which a fuel from the fuel pump is supplied to an outside of the fuel pump module;
a fuel passage connecting the fuel pump to the discharge port; and
a pressure regulating valve disposed in the fuel passage closer to the fuel pump than the discharge port, wherein
the pressure regulating valve has a gravity center inside a space defined by a first virtual cylindrical surface including the housing, the first virtual cylindrical surface being defined by virtually extending the cylindrical shape of the housing.

2. The fuel pump module according to claim 1, further comprising
a residual pressure retention valve disposed in the fuel passage closer to the fuel pump than the discharge port, wherein
the residual pressure retention valve includes a valve body and a valve seat that are disposed inside the space defined by the first virtual cylindrical surface.

3. The fuel pump module according to claim 1, wherein
the fuel passage includes a first passage formed at the housing and a second passage made of a fuel tube that fluidly connects the first passage to the discharge port, and
the first passage is disposed inside the space defined by the first virtual cylindrical surface.

4. The fuel pump module according to claim 1, wherein
the fuel pump, the housing, the filter, the bracket, and the pressure regulating valve are housed in a space defined by a second virtual cylindrical surface having a diameter that is twice as large as a diameter of the housing.

5. The fuel pump module according to claim 4, wherein
the fuel pump module has a cross-sectional area in a cross section perpendicular to an axis of the second virtual cylindrical surface, and
the cross-sectional area is smaller than or equal to an area of the opening.

6. The fuel pump module according to claim 4, further comprising
a fuel amount meter configured to measure an amount of the fuel in the fuel tank, wherein
the fuel amount meter is disposed inside the space defined by the second virtual cylindrical surface.

7. The fuel pump module according to claim 6, wherein
the fuel amount meter includes a float floating on the fuel and a sender connected to the float, and
the float is positioned inside the space defined by the second virtual cylindrical surface when the pump module is inserted into the fuel tank.

8. The fuel pump module according to claim 1, wherein
the pump module has a sub-tank less structure.

9. The fuel pump module according to claim 1 further comprising
a fuel tank defining an opening having a circular shape, wherein
the fuel pump supplies the fuel in the fuel tank,
the lid is configured to cover the opening of the fuel tank, and
a minimum circumscribed surface of both the housing and the filter is smaller than the opening.

10. The fuel pump module according to claim 4, wherein
the second virtual cylindrical surface is coaxial with the first virtual cylindrical surface.

11. A system comprising:
the fuel pump module according to claim 1; and
a fuel tank defining an opening having a circular shape, wherein
the fuel pump supplies the fuel in the fuel tank,
the lid is configured to cover the opening of the fuel tank, and
a minimum circumscribed surface of both the housing and the filter is smaller than the opening.

* * * * *